Patented Mar. 15, 1927.

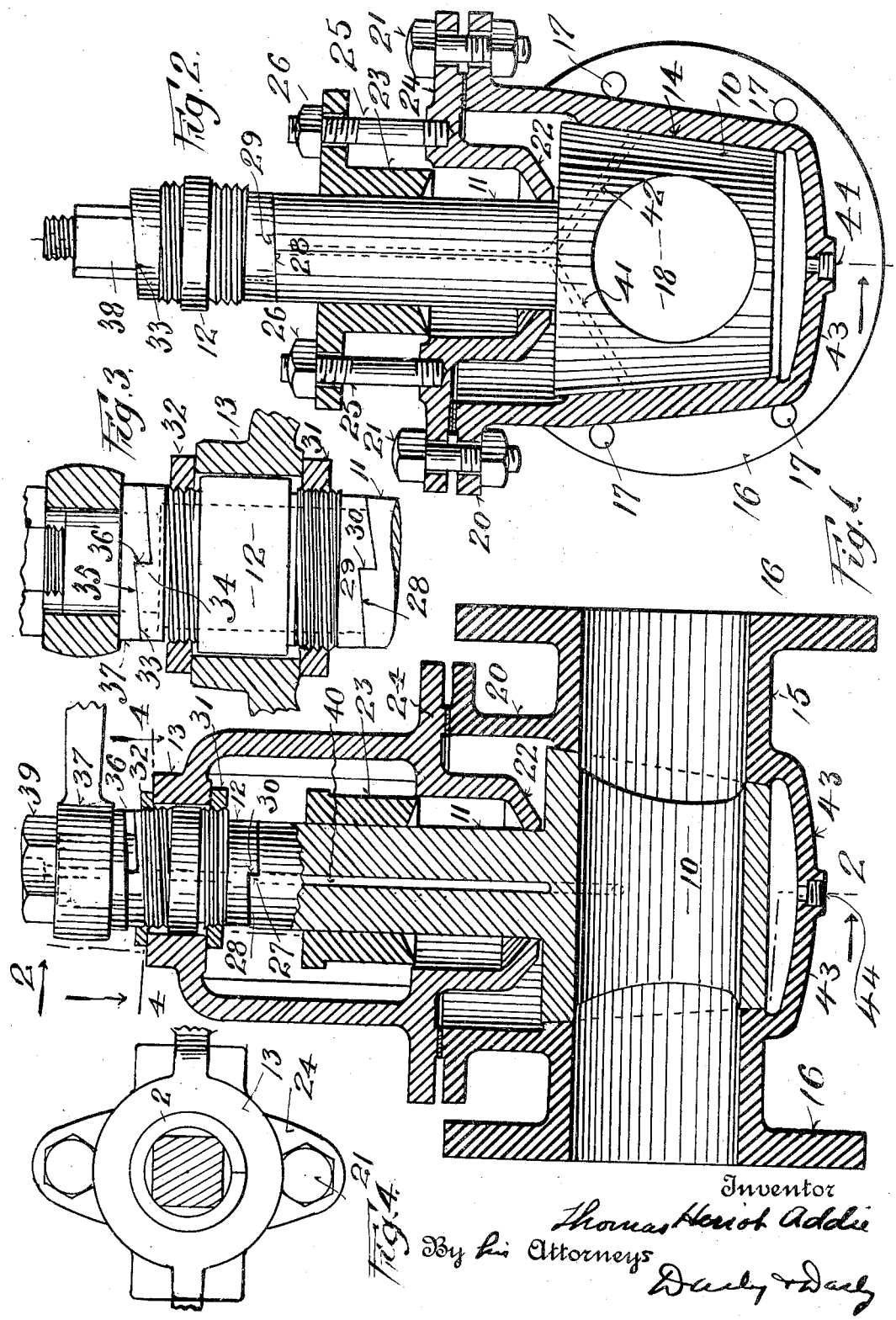

1,620,623

UNITED STATES PATENT OFFICE.

THOMAS HERIOT ADDIE, OF PHILADELPHIA, PENNSYLVANIA.

PLUG COCK.

Application filed June 23, 1925. Serial No. 38,997.

This invention relates to plug cocks and in particular to plug cocks that are adapted for use as acid control valves. Another object of my invention includes the provision of a rugged and serviceable valve construction that will be reliable, and wherein particular provision is made for positively seating and unseating the plug. A further object embraces the provision of lubricating means whereby the plug seat is kept properly lubricated.

Other objects will appear hereinafter, and I attain these results by the construction illustrated in the accompanying drawing, in which—

Fig. 1 is a longitudinal section of my plug cock taken on the line 1—1 of Fig. 2, showing the plug in open position.

Fig. 2 is a cross section taken on the line 2—2 of Fig. 1 of my improved plug cock with the handle removed.

Fig. 3 is an enlarged view of head or handle end with the handle and stem carrying the valve plug turned 90° from the position shown in Fig. 1; that is the plug is in closed position; and Fig. 4 is a view taken on the line 4—4 of Fig. 1, and looking in the direction of the arrow.

Like numerals refer to similar parts throughout the several views.

It is among the prime purposes of my invention to provide a plug valve that is practically acid proof and wherein I have provided special means for slightly lifting the plug to unseat it for more easily moving the same. To this end, I provide a valve plug 10 having a stem 11 which plays in a bushing 12 of the yoke 13. The plug 10 is preferably tapered to be seated in the valve plug seat 14 of the valve coupling 15. This coupling is provided with a flange 16 at either end having bolt holes 17 for securing the said valve in a suitable conduit (not shown). A bore or passage 18 provides for the passage of liquids which are controlled by said valve. The bearing yoke 13 is supported by the yoke seat 24 on the valve seat 20 and is fastened thereto by bolts 21. A depending guide 22 limits the movement of the plug and its stem, and a lower stem bearing 23 is supported from the yoke seat 24 by suitable bolts 25. These bolts are screw-threaded in the seat and are provided with adjusting nuts 26. This construction provides for easy assembling and affords a very firm and substantial support for the valve plug.

It will be noted that stem 11 is provided with a shoulder 27 and a slightly inclined bearing surface 28 which bearing surface engages a corresponding bearing surface 29 and shoulder 30 on the lower surface of the upper stem bearing or bushing 12. This stem bushing is held in the yoke 13 by appropriate adjusting nuts 31 and 32 for adjustably positioning the bushing 12 at the proper distance from the plug seat 14, as will presently appear more clearly. The upper edge of the bushing 12 has a slightly inclined bearing seat 33 which terminates in a shoulder 34 and this seat engages the bearing seat 35 and shoulder 36 of the stem handle 37. The stem handle fits on the square head 38 of the stem 11 and is secured in place by a nut 39, or the like. A central conduit 40 having branches 41 and 42 provides means for lubricating the plug at its seat. A catch basin 43 beneath the plug provides for any waste and a drain plug 44 is provided for cleaning when needed.

From the disclosure thus far given the operation of my construction will be readily understood. By turning the handle and plug from the wide open position shown, for example in Fig. 1, through 90° so that the handle will point straight forward, the plug will be forced downward by the lower cam surfaces. The limit of the closing movement is determined by the stop surface 34 on the bushing 12 engaging the shoulder 36 on the stem handle. This position is best shown in Fig. 3. By turning the lever and plug back to the position shown in Fig. 1, the plug will be raised slightly by the upper cam surfaces. The stop shoulder 30 on the bushing 12 limits the movement of the handle and plug in the open direction. The stop shoulders hold the plug in the exact open or closed position and the cam surfaces aid in seating the plug in the closed position and in unseating said plug as it is moved from the closed position. This provision assists in moving the plug readily and it also provides positive means for disengaging the plug from its seat to which it at times adheres.

It will be also noted that the position of the plug may be adjusted vertically by the adjustment nuts 31 and 32 on the bushing 12 thus properly seating the plug. Lubricant may be supplied to the plug surface and seat by the central conduit 40 and its branches 41 and 42.

While I have described a specific construction to illustrate my invention, I do not thereby desire to be understood as having limited myself unduly as various modifications falling wholly within the spirit and scope of my invention will present themselves to those versed in the art.

What I claim therefore as new and useful, of my own invention and desire to secure by Letters Patent is:

A plug valve comprising a valve coupling having a plug seat, a plug fitting in said seat, a stem on said plug, a yoke having a bushing for engaging the stem at a distance from the plug, means for adjusting said bushing and means for vertically adjusting the plug as it is opened or closed.

In testimony whereof I have hereunto set my hand on this sixteenth day of June, A. D. 1925.

THOMAS HERIOT ADDIE.